United States Patent
Inoue et al.

(10) Patent No.: US 6,467,909 B2
(45) Date of Patent: Oct. 22, 2002

(54) PROJECTION TYPE LIQUID CRYSTAL DISPLAY

(75) Inventors: Masutaka Inoue, Neyagawa; Goro Hamagishi, Toyonaka, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/794,087

(22) Filed: Feb. 28, 2001

(65) Prior Publication Data

US 2001/0017688 A1 Aug. 30, 2001

(30) Foreign Application Priority Data

Feb. 29, 2000 (JP) ........................................ 2000-054986

(51) Int. Cl.[7] ............................................... G03B 21/26
(52) U.S. Cl. ............................ 353/30; 353/84; 349/106
(58) Field of Search ............................ 353/31, 38, 84, 353/88, 89, 81, 30, 32; 349/8, 78, 196, 104, 106

(56) References Cited

U.S. PATENT DOCUMENTS

| | | | | | |
|---|---|---|---|---|---|
| 2,451,902 | A | * | 10/1948 | Bassani et al. | 352/42 |
| 4,798,448 | A | * | 1/1989 | van Raalte | 349/62 |
| 4,836,652 | A | * | 6/1989 | Oishi et al. | 349/110 |
| 5,159,478 | A | * | 10/1992 | Akiyama et al. | 349/106 |
| 5,285,298 | A | * | 2/1994 | Kaneko et al. | 345/87 |

* cited by examiner

*Primary Examiner*—Russell Adams
*Assistant Examiner*—D. Ben Esplin
(74) *Attorney, Agent, or Firm*—Arent Fox Kintner Plotkin & Kahn, PLLC

(57) ABSTRACT

A projection type liquid crystal display comprises a projector 1 including a white light source, a monochrome liquid crystal panel, and a projection lens 7, an image-forming device 2a for forming an image corresponding to each primary color projected from the projector 1 on a diffusion plate 2b, a shutter device 4 formed by arranging a plurality of shutter regions, which can switch light transmission and light shading in the lateral direction, a shutter controlling device 5 for controlling light transmission and light shading of the shutter regions of the shutter device on the basis of timing of projecting an image corresponding to each primary color from the projector and for forming a stripe-shaped image corresponding to a plurality of primary colors in sequence on the diffusion plate 2b, and a plurality of color filters 2c of primary color corresponding to the stripe-shaped image formed on the diffusion plate 2b and disposed on the incident surface side of the diffusion plate 2b.

10 Claims, 3 Drawing Sheets

PROJECTION TYPE LIQUID CRYSTAL DISPLAY

BACKGROUND OF THE INVENTION

1. Field of the Invention

This invention relates to a projection type liquid crystal display that uses a white light source, a monochrome liquid crystal panel, and a projection lens to display a color image.

2. Description of Prior Art

Known methods of projecting a color image by using a liquid crystal panel as a light bulb are: a method which includes three liquid crystal panels for R, G, B and means for optically splitting and synthesizing color such as a dichroic mirror, a dichroic prism or the like; also a method which uses a single liquid crystal panel with a color filter.

The latter projection type liquid crystal display, which uses a single liquid crystal panel to project the color image, does not need an optical system for splitting and synthesizing color, as distinguished from the former display which uses three liquid crystal panels. Such the display can be assembled easily with a light source composed of a simple lamp, a liquid crystal panel with a color filter and a lens, resulting in a reduction of the number of parts. Therefore, it is possible to reduce the size and weight of the unit, and easy to adjust.

SUMMARY OF THE INVENTION

The above-described conventional display, however, displays images for R, G, B on a liquid crystal surface of the single liquid crystal panel simultaneously, causing a low resolution image compared with the display using three liquid crystal panels.

This invention is made to provide a projection type liquid crystal display capable of displaying a high resolution color image by using a single monochrome liquid crystal panel.

This invention comprises a projector, which includes a light source for emitting white light, a monochrome liquid crystal panel driven and switched sequentially in accordance with an image signal corresponding to a plurality of primary colors, and a projection lens for projecting and magnifying an image on a liquid crystal surface of the liquid crystal panel. This invention also comprises a screen, which includes a diffusion member as an image forming surface, an image forming device for forming an image corresponding to each primary color projected from the projector on the diffusion member, a color filter arranged on an incident side of the diffusion member and including a plurality of primary color filters corresponding to a stripe-shaped image formed on the diffusion member. Further, this invention comprises a shutter device and a shutter controlling device. The shutter device includes a plurality of shutter regions, which are arranged in the lateral direction and can switch between light transmission and light shading. The shutter controlling device controls light transmission and light shading of the shutter regions of the shutter device by timing that an image corresponding to each of the primary colors from the projector is projected, and for forming a stripe-shaped image corresponding to a plurality of primary colors in sequence on the diffusion member.

According to the above structure, the display, which uses the single monochrome liquid crystal panel, can display a full color image in time-series and realize a high-resolution image as well as the display using three liquid crystal panels.

The shutter device is arranged in front of the projection lens of the projector. The shutter device is composed of a plurality of the shutter regions capable of switching between light transmission and light shading arranged in the lateral direction with a width narrower than that of the projection lens.

To be concrete, the color filter is formed on the diffusion member or on the diffusion member side of the image-forming device.

The screen may be formed by integrating the diffusion member, the color filters and the image forming device into one body.

According to the structure, the image corresponding to each primary color transmitted from the projector can be formed at a predetermined position on the diffusion member without fail.

In addition, the shutter device may be placed at a diaphragm of the projection lens and may be formed by arranging a plurality of the shutter regions, which can switch between light transmission and light shading, in the lateral direction with a width narrower than that of the projection lens.

According to the structure, a uniform image light is transmitted from the projector through the projection lens, irrespective of the shutter regions. Further, the stripe-shaped image corresponding to each primary color can be formed in each pixel image region on the diffusion member through a light transmission region of the shutter device.

This invention comprises a projector, which includes a light source emitting white light, a monochrome liquid crystal panel driven and switched sequentially in accordance with an image signal corresponding to a plurality of primary colors, and a projection lens for projecting and magnifying an image on a liquid crystal surface of the liquid crystal panel. This invention also comprises a screen, which includes a diffusion member as an image forming surface, an image forming device for forming an image corresponding to each primary color projected from the projector on the diffusion member. Further, this invention comprises a shutter device, a color filter and a shutter controlling device. The shutter device includes a plurality of shutter regions, which are arranged in the lateral direction and can switch between light transmission and light shading. The color filter is arranged on the light incident side or the light transmitting side of the shutter device and includes a plurality of primary color filters corresponding to the shutter regions. The shutter controlling device controls light transmission and light shading of the shutter regions of the shutter device by timing that an image corresponding to each of the primary colors from the projector is projected, and for forming a stripe-shaped image corresponding to a plurality of primary colors in sequence on the diffusion member.

According to this structure, the color filter can have a wide pitch of the margin or the like, resulting in easy manufacture of the color filter.

The foregoing and other objects, features, aspects and advantages of the present invention will become more apparent from the following detailed description of the present invention when collected conjunction with the accompanying drawings.

DESCRIPTION OF PREFERRED EMBODIMENTS

Figure 1:
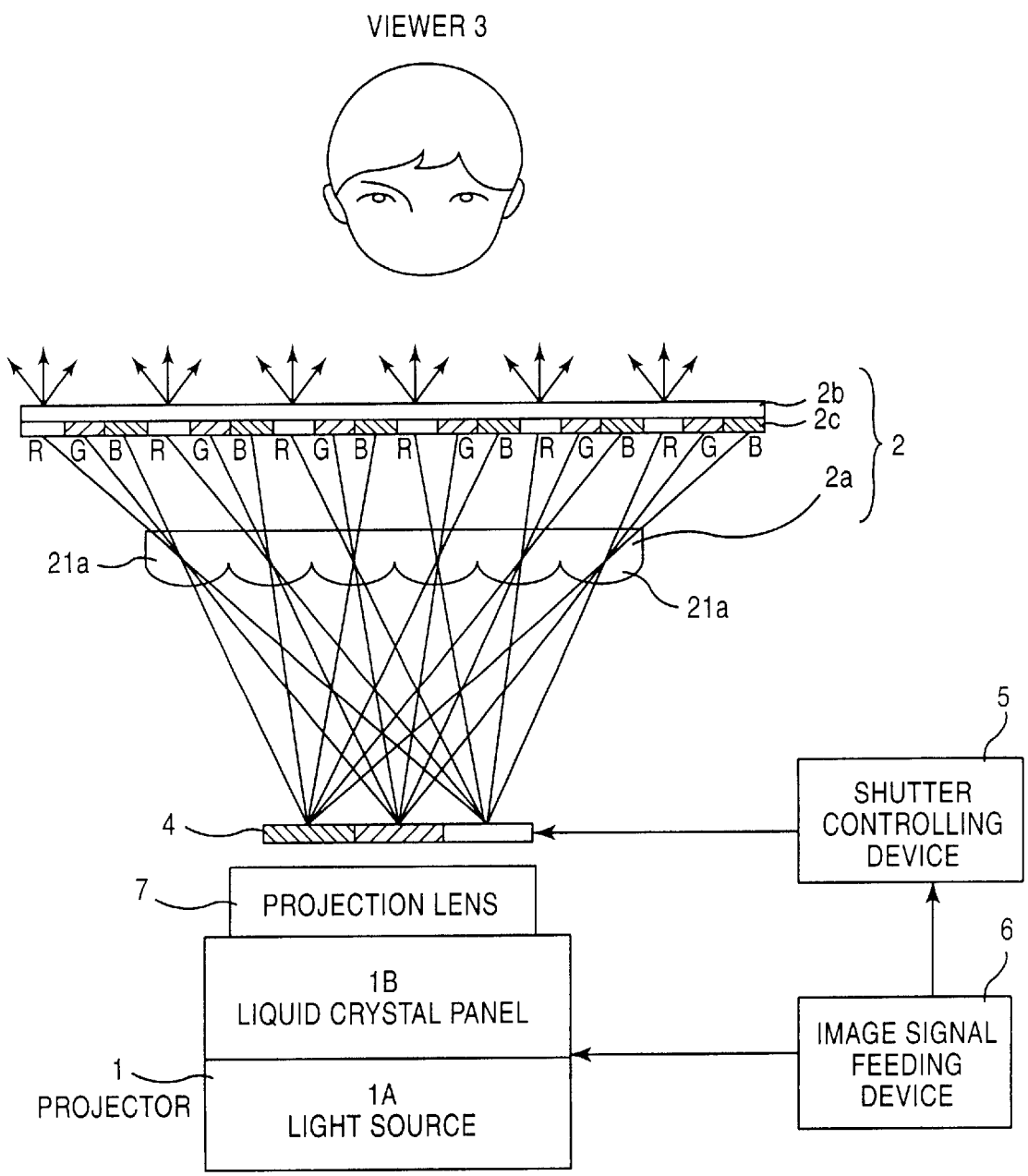
FIG. 1 is a diagram illustrating a structure of a projection type liquid crystal display in a first embodiment according to a present invention.

The explanation of a first embodiment according to the invention is made by referring to figures as follows: FIG. 1 is a diagram illustrating a structure of a projection type liquid crystal display in the embodiment.

The projection type liquid crystal display in the embodiment comprises a screen 2, a projector 1, a shutter device 4 arranged in front of a projection lens of the projector 1, a shutter controlling device 5 for controlling the shutter device 4, and an image signal feeding device 6.

The projector 1 projects an image for red (R), an image for green (G) and an image for blue (B) in sequence on the basis of an image signal from the image signal feeding device 6. The projector 1 is a projector with a single liquid crystal panel comprising a light source 1A emitting white light, a monochrome liquid crystal panel 1B driven and switched in sequence on the basis of the image signal corresponding to R, G, B, and a projection lens 7 for magnifying the image on a liquid crystal surface of the liquid crystal panel.

The image signal feeding device 6 processes an image signal and sends the processed image signal to the projector 1. With this process, the projector 1 projects an image for red, an image for green, and an image for blue in sequence. The liquid crystal panel 1B is driven at frequency three times as fast as a conventional one and displays the images for R, G, B in sequence.

The shutter device 4 includes three shutter regions, which can switch between light transmission and light shading, arranged laterally with a width narrower than that of the projection lens 7. The shutter device 4 is composed of a TN liquid crystal layer, a pair of transparent glass plates provided so as to sandwich the TN liquid crystal layer, an ITO striped pattern portion acts as one of the electrodes, an ITO solid pattern portion acts as another transparent electrode and a polarizing plate on emitting/incident side. The ITO striped pattern portion is composed of an ITO film with three vertical lines corresponding to the shutter region. Although the shutter device in this embodiment uses a TN type liquid crystal panel, it is not limited to it, it also uses the other type of liquid crystal panel such as a diffusion type liquid crystal panel.

The shutter controlling device 5 controls the shutter region to switch between light transmission and light shading on the basis of an output of the image signal feeding device 6. The shutter device 4, for example, changes a rightmost shutter region in FIG. 1 to a light transmitting region in an open state as synchronizing with timing that the projector 1 projects the image for R. The shutter device 4 changes a second shutter region from right in FIG. 1 to a light transmitting region in an open state as synchronizing with timing that the projector 1 projects the image for G. The shutter device 4 changes a third shutter region from right in FIG. 1 to a light transmitting region in an open state as synchronizing with timing that the projector 1 projects the image for B. That is, the shutter device 4 performs time-division control.

The screen 2 is composed of a diffusion plate 2b as a surface for forming an image, a lenticular lens 2a provided on the incident side of the diffusion plate 2b and working as an image forming device, and a color filter 2c including a transmitting filter for color R, a transmitting filter for color G, and a transmitting filter for color B and formed on the incident side of the diffusion plate 2b.

The color filter 2c may be formed on the incident side of the diffusion plate 2b directly or indirectly. Various methods are considered to form the color filter 2c: forming it directly on the diffusion plate 2b by printing or the like, or attaching a member including the color filter 2c on the diffusion plate 2b. The color filter 2c also may be formed on the emitting side of the lenticular lens 2a on the incident side.

The lenticular lens 2a includes lens portions 21a, and forms images R, G, B projected from the projector 1 into an image in a vertical striped shape on the diffusion plate 2b. The images for R, G or B corresponding to the shutter region in an open state travel through the transmission filters for color R, G or B and is formed into the stripe-shaped image R, G or B at an image forming region (each pixel image region) corresponding to each pixel on the diffusion plate 2b, by an operation of the shutter device 4 and the lenticular lens 2a on the incident side. The stripe-shaped images for color R, G, B formed on the diffusion plate 2b are diffused. These processes enable the present invention to display a time-division full color image.

Next, an explanation of a second embodiment according to this invention is made by referring to a figure.

Figure 2:
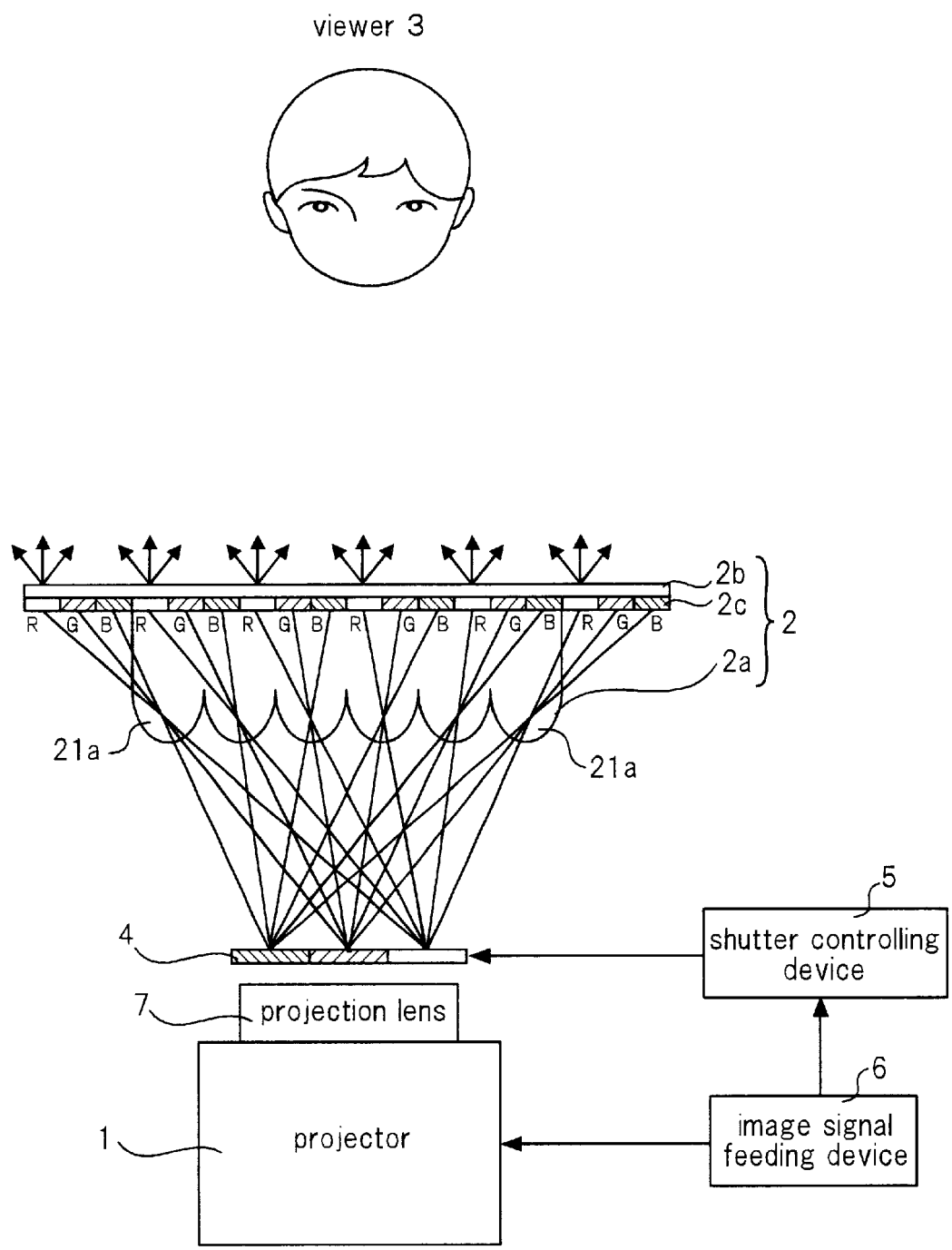
FIG. 2 is a diagram illustrating a structure of a projection type liquid crystal display in a second embodiment according to the present invention.

FIG. 2 is a diagram showing a structure of a projection type liquid crystal display in the second embodiment. The parts having the same functions as those in the first embodiment are given the same reference numbers and their explanations omitted for convenience. The difference from the first embodiment is that the lenticular lens 2a, the color filter 2c and the diffusion plate 2b are integrated into one body. With this integration, position adjustment of the lenticular lens 2, the diffusion plate 2b and the color filter 2c is not necessary in assembling them. As a result the image for R, G, B projected from the projector 1 can be formed at a predetermined position on the diffusion plate 2b without fail.

The color filter 2c' (not shown) formed of diffusing materials on the flat surface of the lenticular lens 2a on the light emitting side may be used instead of the diffusion plate 2b.

At last, an explanation of a third embodiment according to this invention is made by referring to a figure.

Figure 3:
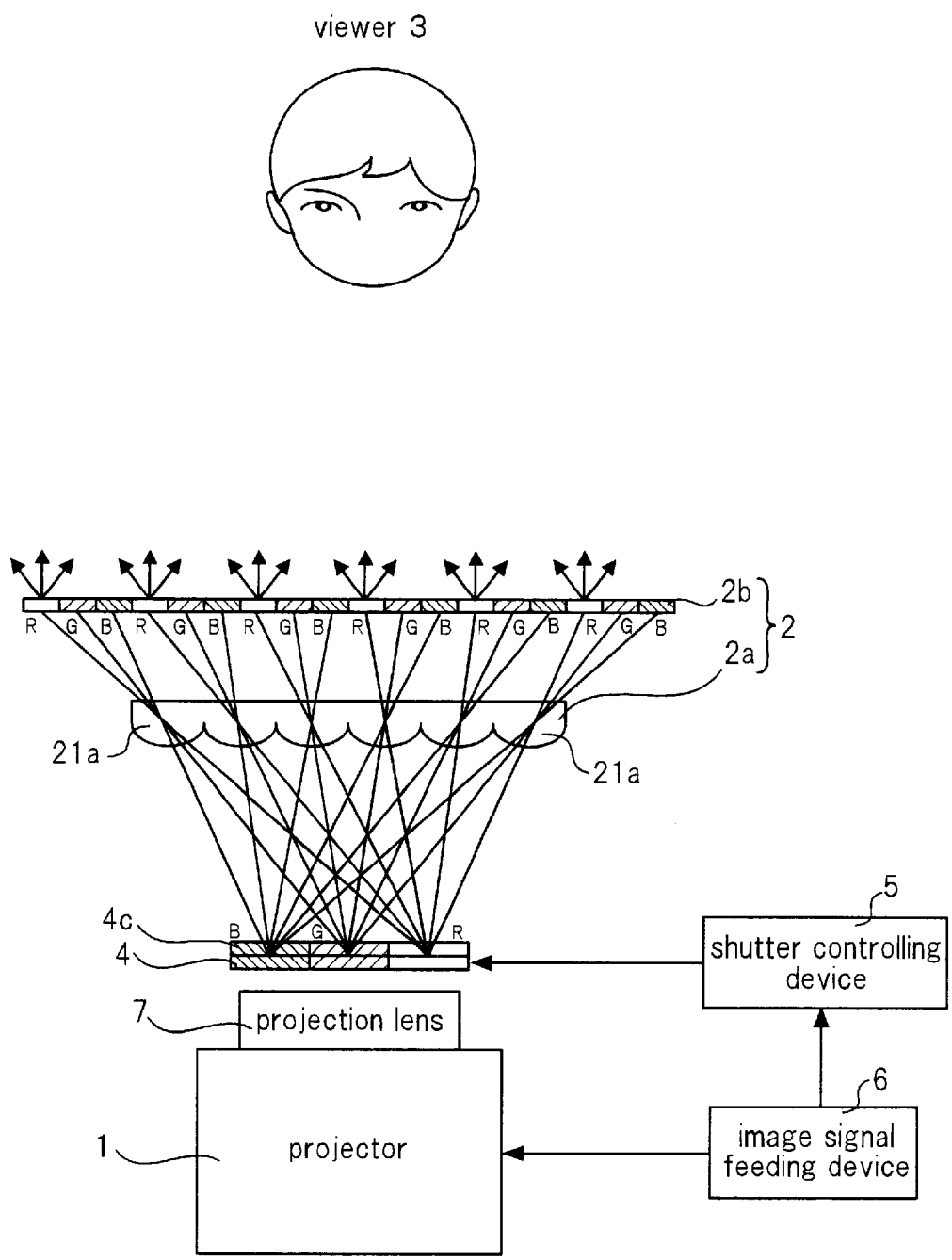
FIG. 3 is a diagram illustrating a structure of a projection type liquid crystal display in a third embodiment according to the present invention.

FIG. 3 is an explanatory diagram showing a structure of a projection type liquid crystal display in the third embodiment. The parts having the same functions as those in the first embodiment are given the same reference number and their explanations omitted for convenience.

The projection type liquid crystal display in this embodiment comprises a screen 2, a projector 1, a shutter device 4 arranged in front of a projection lens of the projector 1, a shutter controlling device 5 controlling the shutter device 4, and an image signal feeding device 6.

The projector 1 projects an image for red (R), an image for green (G) and an image for blue (B) in sequence on the basis of an image signal from the image signal feeding device 6. The projector 1 is a projector with a single liquid crystal panel comprising a light source 1A emitting white light (not shown in FIG. 1), a monochrome liquid crystal panel 1B driven and switched in sequence on the basis of the image signal corresponding to R, G, B (not shown), and a projection lens 7 magnifying the image on a liquid crystal surface of the liquid crystal panel.

The image signal feeding device 6 processes an image signal and sends the processed image signal to the projector 1. With this process, the projector 1 projects an image for red, an image for green, and an image for blue in sequence. The liquid crystal panel 1B is driven at frequency three times as fast as a conventional one and displays the images for R, G, B in sequence.

The shutter device 4 includes three shutter regions, which can switch between light transmission and light shading, arranged laterally with a width narrower than that of the projection lens 7. The shutter device 4 is composed of a TN liquid crystal layer, a pair of transparent glass plates provided so as to sandwich the TN liquid crystal layer, an ITO striped pattern portion serving as one of the electrodes, an ITO solid pattern portion serving as another transparent electrode, and a polarizing plate on emitting/incident side. The ITO striped pattern portion is composed of an ITO film with three vertical lines corresponding to the shutter region. Although the shutter device in this embodiment uses a TN type liquid crystal panel, it is not limited to it, and it also uses the other type of liquid crystal panel such as a diffusion type liquid crystal panel.

The shutter controlling device 5 controls the shutter region to switch between light transmission and light shading based on an output of the image signal feeding device 6. The shutter device 4, for example, changes a rightmost shutter region in FIG. 1 to a light transmitting region in an open state as synchronizing with timing that the projector 1 projects the image for R. The shutter device 4 changes a second shutter region from right in FIG. 1 to a light transmitting region in an open state as synchronizing with timing that the projector 1 projects the image for G. The shutter device 4 changes a third shutter region from right in FIG. 1 to a light transmitting region in an open state as synchronizing with timing that the projector 1 projects the image for B. That is, the shutter device 4 performs time-division control.

In the third embodiment, a color filter 4c composed of transmitting filters for color R, G, B is formed on the emitting side or the incident side of the shutter device 4. As shown in FIG. 3, the transmitting filter for color R in the color filter 4 corresponds to the shutter region at rightmost in the figure. The transmitting filter for color G corresponds to the second shutter region from right in the figure. The transmitting filter for color B corresponds to the third shutter region from right in the figure.

The screen 2 is composed of a diffusion plate 2b as a surface for forming an image, and a lenticular lens 2a provided on the incident side of the diffusion plate 2b.

Each of images for R, G, B from the projector 1 is transmitted respectively through the corresponding transmitting filters for color R, G, B in the color filter 4c of the shutter device 4. The lenticular lens 2a including lens portions 21a forms the transmitted images R, G, B into images in the vertical striped shape on the diffusion plate 2b. The stripe-shaped image for R, G or B is formed in the image forming region (each pixel image region) corresponding to each pixel on the diffusion plate 2b. The stripe-shaped images for color R, G, B formed on the diffusion plate 2b are diffused. These processes enable the present invention to display a time-division full color image.

In the third embodiment, the color filter 4c can be provided corresponding to the shutter region of the device 4 instead of each pixel. According to this structure, the color filter can have a wide pitch of the margin or the like, resulting in easy manufacture of the color filter 4c.

Although the lenticular lens 2a and the diffusion plate 2b are separately formed in the embodiment shown in FIG. 3, the lens 2a and the plate 2b can be formed integrally.

Although the lenticular lens is used as the image-forming device in the above-described embodiment, for example, a parallax barrier can be substituted for the lens even though the amount of light decreases.

Although the shutter device 4 is arranged in front of the projection lens 7 of the projector 1 in the above-described embodiment, the shutter device 4 may be arranged on the diaphragm of the projection lens 7. This arrangement works effectively in a case where the image light, which is to be formed at both end parts of the diffusion plate 2b and corresponds to the light transmission region of the shutter device 4, does not reach each pixel image region and is not formed into an image owing to an arrangement of the components such as the diffusion plate 2b when the shutter device 4 is provided in front of the projection lens 7 of the projector 1, as the above mentioned embodiment. In other words, image light from the projector 1 can be projected uniformly through the projection lens regardless of the shutter region of the shutter device 4 by arranging the shutter device 4 at the diaphragm of the projection lens 7. Therefore, stripe-shaped images for R, G, B can be surely formed in each pixel image region on the diffusion plate 2b corresponding to the light transmission region of the shutter device 4.

As described above, the present invention can display a full color image in time-series by using a single monochrome liquid crystal panel and realizes a projection type liquid crystal display with as high a resolution as one which uses three liquid crystal panels.

Although the present invention has been described and illustrated in detail, it is clearly understood that the same is and example only and is not to be taken by way of limitation by way of illustration, the spirit and scope of the present invention being limited only by the terms of the appended claims.

What we claim is:

1. A projection type liquid crystal display comprising:
    a projector, which includes a light source emitting white light, a monochrome liquid crystal panel driven and switched sequentially in accordance with an image signal corresponding to a plurality of primary colors, and a projection lens for projecting and magnifying an image on a liquid crystal surface of the liquid crystal panel;
    a screen, which includes a diffusion member as an image forming surface, an image forming device for forming an image corresponding to each primary color projected from the projector on the diffusion member, a color filter arranged on an incident side of the diffusion member and including a plurality of primary color filters corresponding to a stripe-shaped image formed on the diffusion member;
    a shutter device, which includes a plurality of shutter regions in the lateral direction which can switch between light transmission and light shading; and
    a shutter controlling device for controlling light transmission and light shading of the shutter regions of the shutter device on the basis of timing of projecting an image corresponding to each primary color from the projector and for forming a stripe-shaped image corresponding to a plurality of primary colors in sequence on the diffusion member.

2. The projection type liquid crystal display according to claim 1, wherein the shutter device is arranged in front of the projection lens of the projector and formed by arranging a plurality of shutter regions, which can switch between light transmission and light shading, laterally with a width narrower than that of the projection lens.

3. The projection type liquid crystal display according to claim 1, wherein the color filters are formed on the diffusion member.

4. The projection type liquid crystal display according to claim 1, wherein the color filters are provided on the diffusion member side of the image forming device.

5. The projection type liquid crystal display according to claim 1, wherein the screen is formed by integrating the diffusion member, the color filter and the image forming device into one body.

6. The projection type liquid crystal display according to claim 1, wherein the shutter device is placed at a diaphragm of the projection lens of the projector and includes a plurality of the shutter regions, which can switch light transmission and light shading, arranged laterally with a width narrower than the projection lens.

7. A projection type liquid crystal display comprising:
- a projector, which includes a light source emitting white light, a monochrome liquid crystal panel driven and switched sequentially in accordance with an image signal corresponding to a plurality of primary colors, and a projection lens for projecting and magnifying an image on a liquid crystal surface of the liquid crystal panel;
- a screen, which includes a diffusion member as an image forming surface,
- an image forming device for forming an image corresponding to each primary color projected from the projector on the diffusion member;
- a shutter device, which includes a plurality of shutter regions in the lateral direction which can switch between light transmission and light shading;
- a color filter arranged on the incident side or the transmitting side of the shutter device and including a plurality of primary color filters corresponding to the shutter regions; and
- a shutter controlling device for controlling light transmission and light shading of the shutter regions of the shutter device on the basis of timing of projecting an image corresponding to each primary color from the projector and for forming a stripe-shaped image corresponding to a plurality of primary colors in sequence on the diffusion member.

8. The projection type liquid crystal display according to claim 7, wherein the shutter device is placed in front of the projection lens of the projector and includes a plurality of the shutter regions, which can switch light transmission and light shading, arranged laterally with a width narrower than that of the projection lens.

9. The projection type liquid crystal display according to claim 7, wherein the screen is formed by integrating the diffusion member and the image forming device into one body.

10. The projection type liquid crystal display according to claim 7, wherein the shutter device is placed at a diaphragm of the projection lens of the projector and includes a plurality of the shutter regions, which can switch light transmission and light shading, arranged laterally with a width narrower than that of the projection lens.

* * * * *